Sept. 3, 1963 W. A. STONER ETAL 3,102,481
PUMP
Filed Dec. 19, 1958 3 Sheets-Sheet 1

INVENTORS:
Willis A. Stoner
Dean A. Rains
By Smyth & Roston
Attorneys

Sept. 3, 1963 W. A. STONER ETAL 3,102,481
PUMP
Filed Dec. 19, 1958 3 Sheets-Sheet 2

INVENTORS:
Willis A. Stoner
Dean A. Rains

INVENTORS:
Willis A. Stoner
Dean A. Rains
Attorneys

United States Patent Office 3,102,481
Patented Sept. 3, 1963

3,102,481
PUMP
Willis A. Stoner, Long Beach, and Dean A. Rains, Los Angeles, Calif., assignors to Curtiss-Wright Corporation, Propulsion Products Division, Santa Monica, Calif.
Filed Dec. 19, 1958, Ser. No. 781,600
4 Claims. (Cl. 103—5)

This invention relates to a pump having special utility for volatile liquids or liquids containing substantial portions of non-condensible gases, and is particularly directed to the problem of making such a pump self-priming. While the invention is widely applicable for its purpose, it has been initially designed to serve as a booster pump or fuel transfer pump for use on an aircraft. This embodiment of the invention is described herein by way of example for the purpose of disclosure and will provide adequate guidance for those skilled in the art who may have occasion to apply the same basic principles to other particular purposes.

When an aircraft climbs rapidly to a high altitude, the resultant reduction of pressure in the fuel tank causes the volatile fuel to boil. A successful transfer pump must, therefore, be capable of functioning satisfactorily in a vigorously cavitating fluid and must be free from vapor lock even when substantial amounts of vapor are present inside the pump passage. This problem of handling a volatile fuel is made more difficult by the fact that the weight and space limitations of an aircraft require the use of small high speed fuel transfer pumps. Another problem arises from the fact that an aircraft frequently rocks, turns, accelerates or decelerates to cause fuel in a partly filled tank to slosh entirely away from the fuel pump in the tank. Such a temporary absence of liquid at the pump inlet causes the usual transfer pump to lose its prime.

A third problem is to provide a transfer fuel pump that will substantially empty a fuel tank. Such a pump must be capable of pumping fuel from an extremely low liquid level in the tank.

The pump of the present invention meets all of these problems by the provision of a passage for fluid flow that extends upward from the bottom of the pump casing with space for radially inward flow into the bottom inlet end of the passage and with a rotary impeller assembly in this inlet end of the passage. The impeller assembly comprises an inducer impeller at the inlet end of the passage and an associated centrifugal impeller spaced upward therefrom. The two impellers form an axial chamber, the bottom of which opens on the bottom of the pump casing.

Normally the liquid fuel is driven through the pump by the centrifugal impeller in the same manner as in a conventional centrifugal pump. In the event, however, that the centrifugal impeller loses its prime or tends to do so, the inducer impeller picks up increments of the liquid and throws the increments in numerous trajectories across the axial chamber into the inlet areas of the centrifugal impeller to prime the centrifugal impeller or to keep it primed. Thus whenever necessary to sustain operation, the inducer impeller operates without its blade passages being filled with liquid and consequently without creating a static pressure rise, the liquid being moved to the centrifugal impeller substantially entirely by kinetic energy as distinguished from fluid pressure.

If excessive cavitation tends to occur for any reason, such as an excessive vaporization or the presence of excessive non-condensible gaseous fluid, the axial chamber functions in this manner as a kinetic zone between the inducer and the centrifugal impeller. Pumping action is not interrupted.

When the liquid level in the fuel tank falls to such a low level as to empty the axial chamber, the pump automatically shifts to kinetic operation. Thus as long as there is enough liquid to even partially immerse the inducer impeller, the pump continues to function to withdraw fuel from the tank.

In some practices of the invention, the axial chamber through which the fluid moves from the inducer to the centrifugal impeller is vented to the exterior of the pump to provide for purging vapor and non-combustible gases from the fluid stream in the pump. In the operation of such a vented pump, it is contemplated that bubbles of vapor and/or gas above a given size will migrate centripetally to the central region of the axial chamber for venting therefrom but that bubbles below the critical size will move expeditiously through the centrifugal impeller.

For this purpose, the inlet areas of the centrifugal impeller are relatively large for a given rate of flow to result in a relatively low radial component of velocity as the fluid initiates passage through the centrifugal impeller. Since the tangential component of velocity at this stage is large compared to the radial component, bubbles larger than the critical size that are entrained by the flow migrate inwardly centripetally but bubbles smaller than the critical size are dragged through the impeller. In this regard, a feature of the invention is that the centrifugal impeller passages formed by the blades of the impeller taper rapidly in cross-sectional area, the degree of taper being sufficient to cause the drag force on the bubbles to increase faster than the centrifugal force.

While the pump may be vented for the purpose of some installations, it has been found, unexpectedly, that the pump actually works more efficiently even with a highly volatile fluid when the kinetic zone is not vented to the exterior of the pump. In the absence of venting, the centrifugal impeller causes the pressure in the kinetic zone to drop below the ambient pressure, and the resulting pressure drop greatly promotes flow into the pump inlet. It is surprising that the unvented pump does not vapor-lock even under the most unfavorable conditions. There is reason to believe that the time in flight of the increments of liquid thrown across the kinetic zone is too short to permit flashing of the liquid. At 6000 r.p.m., the peripheral speed of an inducer of two inches O.D. is approximately fifty feet per second and the consequent time of flight of the liquid increments across the kinetic zone is on the order of $1/500$ of a second.

The various features and advantages of the invention may be understood from the following detailed description together with the accompanying drawings.

In the drawings, which are to be regarded as merely illustrative:

Figure 1:
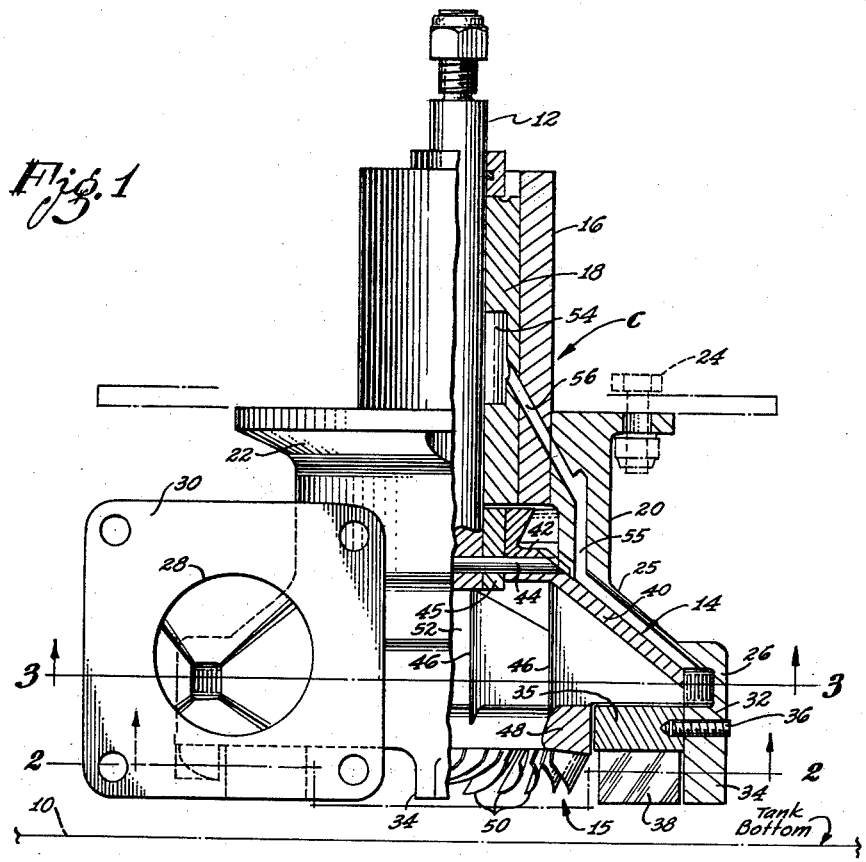
FIG. 1 is a view of an embodiment of the invention that is not vented, the view being partly in side elevation and partly in section.
Figure 2:
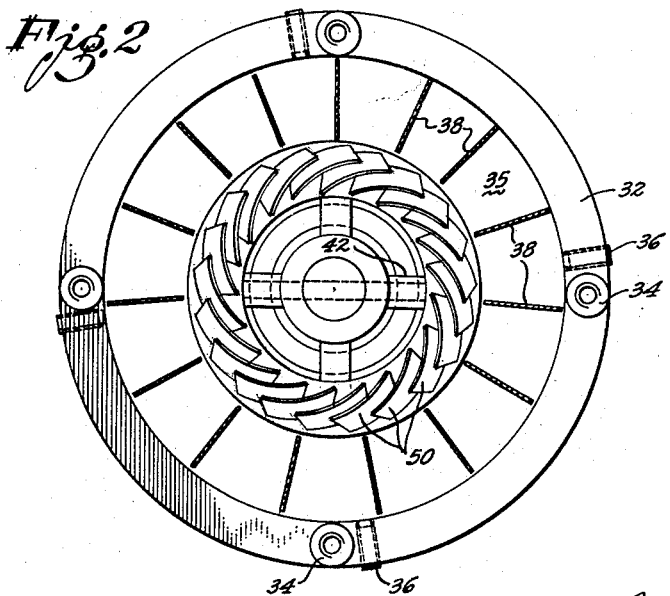
FIG. 2 is a bottom view of the pump, partly in section as seen along the line 2—2 of FIG. 1, showing the inducer and a surrounding series of radial stator vanes.
Figure 3:
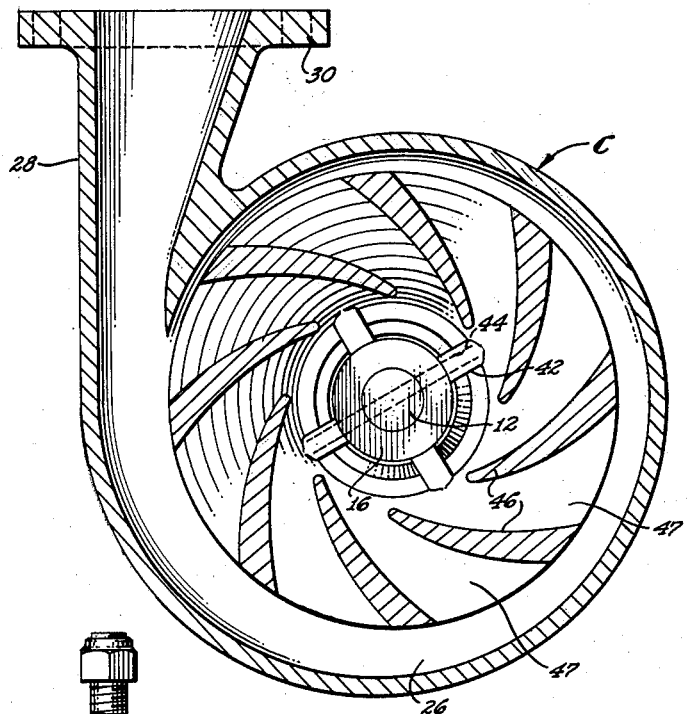
FIG. 3 is a transverse section taken as indicated by the line 3—3 of FIG. 1 to show the configuration of the centrifugal impeller and the associated volute.

The first form of the invention shown in FIGS. 1 to 3 is intended to be mounted in a fuel tank having a bottom wall 10, the fuel pump being mounted in an opening in the top wall of the tank with the upper end of the pump exposed for connection to actuating means. The pump has a casing, generally designated C, which encloses an impeller assembly comprising a shaft 12, a centrifugal impeller, generally designated by numeral 14, and an inducer impeller, generally designated by the numeral 15.

The casing C has an upper journal portion 16 which encloses a bearing sleeve 18 for the shaft 12. The journal portion 16 is fixedly embraced at its lower end by a cylindrical wall 20 that is formed with an apertured flange 22 to receive supporting bolts 24. Integral with the cylindrical wall 20 is a downwardly flared casing wall 25 together with a volute 26 shown in FIG. 3 and the usual tangential discharge conduit 28. The discharge conduit 28 may be formed in the usual manner with an apertured flange 30 for connection with the fuel system of the aircraft.

Below the volute 26, the casing is formed with a downwardly extending cylindrical portion 32 which may be formed with four circumferentially spaced base lugs or legs 34. The lower cylindrical portion 32 of the casing encloses a stator ring 35 which is secured thereto by radial screws 36. As best shown in FIG. 2, the stator ring 35 carries a circumferential series of fixed radial stator vanes 38.

The centrifugal impeller 14 has a flared circumferential wall 40 which conforms to the flared wall 25 of the casing. The centrifugal impeller is supported at its upper region by a series of four radial spokes 42 that are integral with the flared impeller wall 40. The centrifugal impeller 14 is rigidly connected to the shaft 12 by a diametrical dowel 44 which extends through a diametrical pair of the spokes 42 and through an intervening sleeve 45. The centrifugal impeller has integral blades 46 of the configuration in plan shown in FIG. 3, the blades forming centrifugal passages 47. The centrifugal impeller blades 46 overhang the stator ring 45 and are integral with what may be termed an inducer ring 48 that rotates inside the stator ring 35. The inducer impeller comprises a circumferential series of inducer blades 50 surrounded by the circumferential series of the stator vanes 38.

The described construction provides a passage for fluid flow through the pump casing, which fluid passage includes the discharge conduit 28, the volute 26, the passages through the blades of the centrifugal impeller 14, an axial chamber 52 defined in part by the centrifugal impeller and in part by the inducer impeller, the passages formed by the inducer blades 50 and the radial passages formed by the stator vanes 38. It is apparent that this fluid passage through the pump casing has a radially inwardly directed intake portion provided by the stator vanes 38 and, in addition, has an axial intake portion formed by the eye of the inducer impeller 15. The proportion of the intake flow that passes radially inward through the stator vanes 38 depends on the spacing of the stator vanes from the bottom wall 10 of the fuel tank. With the stator vanes 38 spaced liberally from the bottom wall of the tank, as indicated in FIG. 1, a relatively small proportion of the total fluid intake will normally pass through the stator blades 38 and the inducer blades 50, say 20% of the total. In some installations, however, the pump may be positioned so close to the bottom wall of the tank that substantially all of the intake flows radially inward through the stator vanes 38.

The inducer blades 50 are thin blades that have sharpened leading edges. The inducer blades 50 are both inclined from the vertical and set at an exceptionally small angle to tangential.

Preferably the journal for the shaft 12 is lubricated by the fuel that is being pumped. For this purpose, the bearing sleeve 18 may be formed with a wide inner circumferential groove 54 which is in communication with the interior of the pump in the region of the centrifugal impeller 14. As shown in FIG. 1, at least one bore 55 may extend upward from the region of the centrifugal impeller through the cylindrical wall 20 to communicate with a second inclined bore 56 that extends both through the upper journaled portion 16 of the casing and through the bearing sleeve 18 to terminate in the circumferential groove 54.

With the fuel tank containing fuel to a substantial level and with the pump operating at an appropriate speed, say 6000 r.p.m., the pump operates in what may be termed its normal manner with fluid flow through the pump sustained primarily by the centrifugal impeller. Under this operating condition, the axial chamber 52 is substantially full of liquid and the action of the inducer impeller is not at all necessary to sustain flow.

Under certain conditions, however, the liquid content of the axial chamber 54 drops off to such an extent that the centrifugal impeller tends to become inefficient and lose its prime, the centrifugal pump being unable in itself to restore the prime once the prime is lost. The liquid content of the axial chamber may be lowered by excessive cavitation and by excessive boiling. The axial chamber 52 may also be momentarily emptied by sloshing of the fuel away from the pump and the axial chamber is emptied whenever the consumption of fuel drops the liquid level below the pump casing to the region of the stator vanes 38.

When substantial voids appear in the axial chamber 52 or when the axial chamber is substantially completely emptied of its liquid content, the axial chamber becomes a zone of kinetic action. The thin, low angle, inclined and cambered inducer blades 50 slice off increments of the surrounding liquid and throw the liquid increments upward across the axial chamber 52 in numerous inclined substantially straight-line trajectories that form an overall pattern of hour-glass configuration. The behavior of the liquid increments may be analyzed in terms of components of force. Thus the liquid increments enter the inducer in one resultant direction and this resultant direction is changed slightly by the camber and inclination from vertical of the inducer blades. There is a high magnitude radial component and a whirling action with consequent centrifugal force which gives the final resultant upwardly inclined trajectories.

The trajectories of the liquid increments are intercepted by the inlet areas of the centrifugal impeller 14 which surround the axial chamber 52. In this regard, a feature of the construction is that the inlet areas of the centrifugal impeller are of substantial vertical dimension to accommodate a wide vertical spread in the pattern of trajectories to favor the projection of the increments directly into the centrifugal impeller.

Since the axial chamber 52 is not vented to the exterior of the pump, the action of the centrifugal impeller 14 results in sub-atmospheric pressure in the axial chamber and the consequent pressure drop promotes flow into the axial chamber. This pressure drop tends to cause the liquid to flash, especially when there is a substantial void in the axial chamber and the pump is operating with kinetic action in the chamber. As heretofore stated, however, apparently the liquid increments are thrown across the axial chamber with such speed that there is not a sufficient time interval to permit the increments to flash into vapor. Whenever the centrifugal impeller loses its prime and whenever the quantity of fuel in the tank drops to just below the stator ring 35, the pump automatically shifts to kinetic action in the zone of the axial chamber 52. When the fuel level is low, the pump continues to function with kinetic action in the axial chamber 52 until the residual quantity of fuel actually drops clear of the inducer blades 50.

Figure 4:
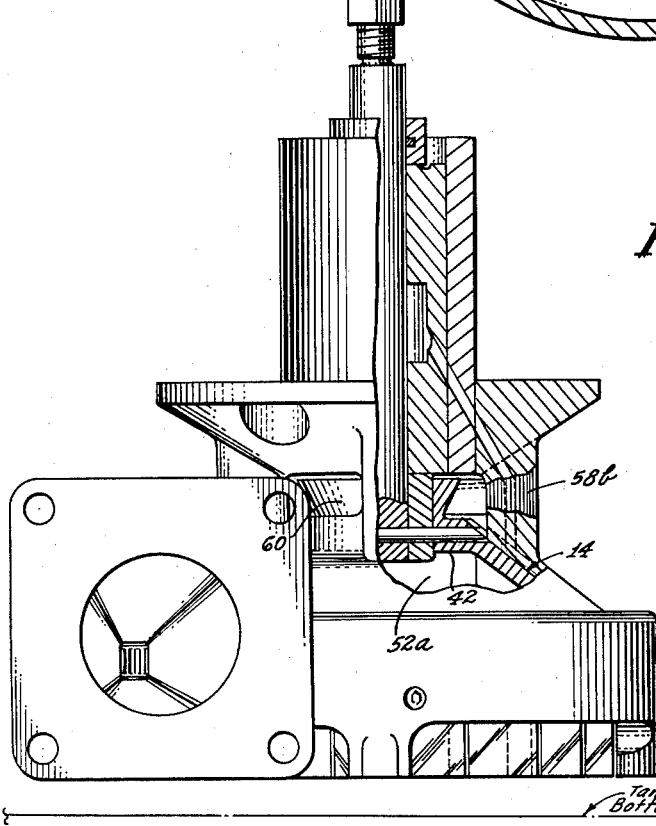
FIG. 4 is a side elevational view, partly in section, showing an embodiment of the invention that is vented to purge vapor and non-condensible gases from the liquid in the pump.

The second embodiment of the invention shown in FIG. 4 is largely similar to the first described embodiment, as indicated by the use of corresponding reference numerals, for corresponding parts. The sole difference is that the axial chamber 52a is vented to the exterior of the pump. For this purpose, the previously described cylindrical wall 20 of the casing is replaced by four circumferentially spaced vertical struts 58b that are integral at their upper ends with the casing flange 22 and are integral at their lower ends with the flared casing wall 25. These four struts 58b form four corresponding windows or radial openings 60 around the casing so that vapor and non-condensible gases may be purged from the axial chamber 52a through the spaces between the spokes 42 and out through the radial openings 60.

The venting of the axial chamber 52a prevents the centrifugal impeller 14 from reducing the pressure in the axial chamber below the ambient pressure, but nevertheless the pump operates with high efficiency both under normal conditions when the axial chamber is filled with liquid and under extremely unfavorable conditions when the axial chamber is substantially emptied of liquid. When the pump functions with kinetic action in the axial chamber 52 in the general manner heretofore described, bubbles of vapor and non-condensible gases above a given critical size migrate centripetally to the central region of the axial chamber and escape to the exterior of the pump by vent paths past the spokes 42 and out of the radial windows 60. In this regard, it is important to note that the inlet areas of the centrifugal passages 47 are large for the given rate of flow through the pump. The large inlet areas of the centrifugal passages 47 result in a low radial component of velocity entering the centrifugal passages and since the tangential component of velocity is large compared with the radial component, the bubbles larger than the critical size that are entrained by the flow entering the centrifugal passages are thrust radially back to the central region of the axial chamber by centripetal force. The bubbles that are smaller than the critical size are dragged through the centrifugal passages 47.

A feature of the invention is that the centrifugal passages 47 taper drastically in cross-sectional area to make sure that the smaller bubbles do not linger and accumulate in the centrifugal impeller. If the plan configuration of the centrifugal passages 47 shown in FIG. 3 is considered alone, it would seem that the centrifugal passages actually expand, but the centrifugal passages taper abruptly in vertical cross section as may be seen in FIG. 1 and the net effect is that the cross-sectional areas of the centrifugal passages taper so drastically with increasing radial distance from the axial chamber 52 that the drag of the flowing liquid on the entrained bubbles increases much more rapidly than centrifugal force. Thus any bubble below the critical size that moves well into the entrance of the centrifugal passages 46 continues to move outward with the flowing liquid without hesitation.

Figure 5:
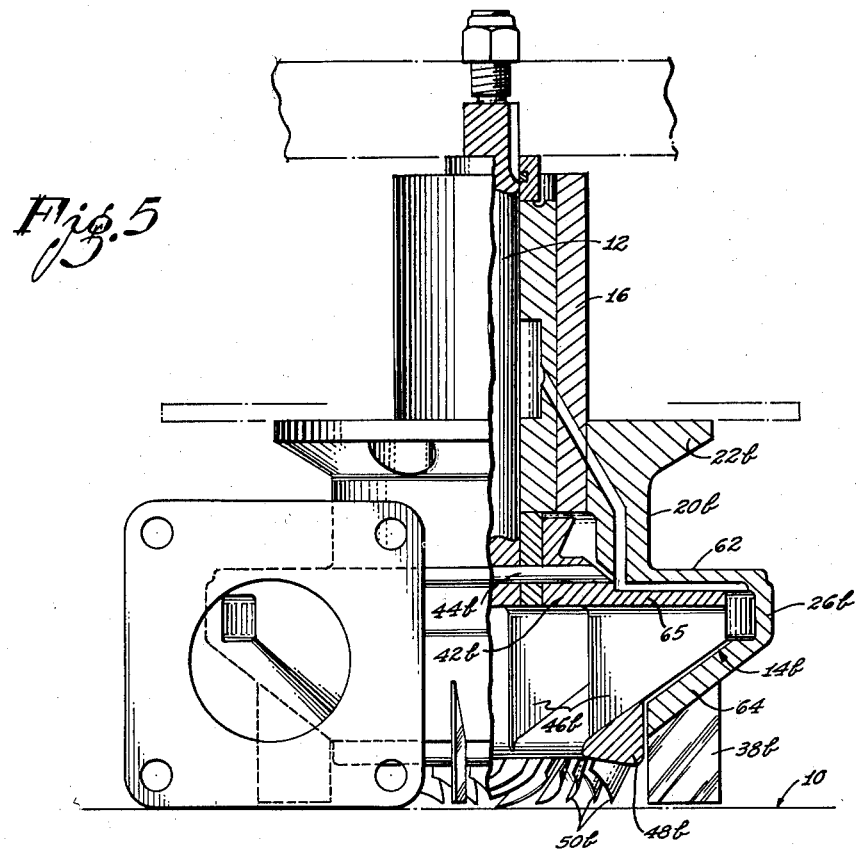
FIG. 5 is a view similar to FIG. 1 showing another embodiment of the invention that is not vented.

The third embodiment of the invention shown in FIG. 5 is largely similar to the first described embodiment, as indicated by the use of corresponding reference numerals for corresponding parts. The exception is that the tapering configuration of the centrifugal impeller 14b is reversed, the narrower end of the tapered impeller being the lower end instead of the upper end.

In the construction shown in FIG. 5, the pump casing has the usual journal portion 16 and this journal portion is surrounded at its lower end by a wall 20b corresponding to the previously described wall 20, the wall 20b having the usual apertured flange 22b. The wall 20b is integral with a horizontal radial casing wall 62 across the top of the centrifugal impeller 14b and the usual volute 26b around the periphery of the centrifugal impeller. The volute 26b is integral with a conically curved bottom casing wall 64 that inclines inwardly under the centrifugal impeller. The usual series of stator vanes 38b extend downward from the inclined bottom casing wall 64.

The centrifugal impeller 14b has a horizontal top wall 65 that conforms with the radial casing wall 62 and this impeller wall is integral with the usual series of four spokes 42b. In the previously described manner, the centrifugal impeller 14b is connected with the shaft 12 by means of a radial dowel pin 44b. The centrifugal impeller blades 46b are of the previously described configuration to form drastically tapered centrifugal passages. The impeller blades 46b are integral with the top wall 65 of the impeller and are also integral with an inducer ring 48b that carries the usual downwardly extending inducer blades 50b.

It will be apparent that this third embodiment of the pump shown in FIG. 5 functions in substantially the same manner as the first embodiment shown in FIGS. 1 to 3. The advantage of reversing the tapering configuration of the centrifugal impeller is that it shortens the paths of flight of the liquid increments from the inducer blades 50b to the entrance areas of the centrifugal impeller and thus reduces the time in flight of the liquid increments.

Figure 6:
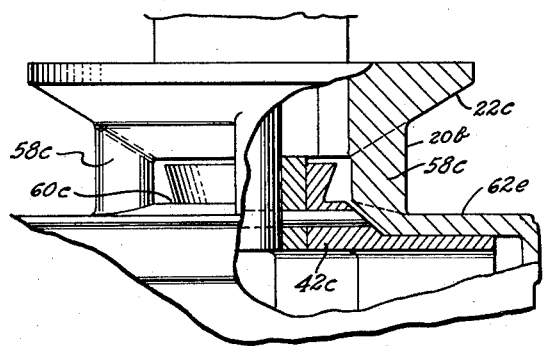
FIG. 6 is a fragmentary side elevational view, partly in section, showing how the structure shown in FIG. 5 may be modified to provide venting.

FIG. 6 indicates how the pump structure shown in FIG. 5 may be modified for venting the axial chamber of the pump to the exterior of the pump casing. The modification consists of substituting four circumferentially spaced vertical struts 58c for the circumferential wall 20b, the four struts forming four windows or radial openings 60c. The struts 58c are integral at their upper ends with the usual apertured casing flange 22c and are integral at their lower ends with the radial wall 62c of the pump casing. It is apparent that this last vented modification of the invention functions in the same manner as the second embodiment of the invention shown in FIG. 4.

In all forms of the invention, the series of stator blades that surround the series of inducer blades removes whirl from the intake flow and further serves the important function of blocking the tendency for liquid to be thrown from the inducer blades along tangential paths by centrifugal force. This tendency becomes pronounced when the fuel level drops close to the bottom of the fuel tank. In FIG. 5 the stator blades 38b are so close to the bottom wall 10 of the tank that substantially all of the intake flow is radially inward flow. In some practices of the invention, the stator blades may actually contact the bottom wall of the fuel tank to at least partially support the pump.

Our description of the selected embodiments of the invention in specific detail will suggest various changes, substitutions and other departures from our disclosure within the spirit and scope of the appended claims.

We claim:

1. A pump for liquids, comprising in combination a casing open at the bottom and having a vertically disposed longitudinal axis;
a centrifugal impeller disposed within said casing coaxial therewith and rotatable about said axis in a plane normal thereto, said centrifugal impeller having a plurality of impeller blades having exit passages therebetween, said blades being disposed in a generally annular configuration with the leading edges of the blades positioned at the inner circumference of the annulus and the trailing edges positioned at the outer circumference of the annulus, the leading edges of said blades defining an upper axial chamber communicating with said exit passages;
an inducer coaxial with said impeller and positioned therebelow and rotatable therewith, said inducer comprising a generally annular element having a plurality of annularly disposed inducer blades extending downwardly therefrom to below the bottom of the said casing and having entrance passages therebetween, said inducer blades being inwardly inclined at their bottoms and having their leading edges positioned at the outer circumference of the annulus and their trailing edges positioned at the inner circumference of the annulus, said annular element and said inducer blades defining a lower axial chamber communicating with said entrance passages and axially with said upper chamber and of substantially the same diameter as said upper chamber, said inducer blades being adapted by their inclination to throw increments of liquid from said entrance passages in multiple trajectories angularly upward and across said lower chamber and said upper chamber into said exit passages, said trajectories forming a generally hour-glass configuration;

and a plurality of stator vanes extending downwardly from said casing below the bottom thereof and radial to said axis in an annular configuration surrounding said inducer blades and substantially in the same plane therewith.

2. The combination recited in claim 1, in which said upper axial chamber is of substantially greater vertical dimension than said lower axial chamber.

3. The combination recited in claim 2, in which said exit passages taper from large inlet areas to small outlet areas, each of said inlets having a rectangular entrance aperture normal to a radius passing through the center thereof.

4. The combination recited in claim 3, in which said impeller blades and said inducer blades are helically curved.

References Cited in the file of this patent

UNITED STATES PATENTS

| | | |
|---|---|---|
| 2,265,809 | Goldschmied | Dec. 9, 1941 |
| 2,429,978 | Blanchard | Nov. 4, 1947 |
| 2,575,923 | McMahan | Nov. 20, 1951 |
| 2,623,466 | Tinker | Dec. 30, 1952 |
| 2,704,516 | Mock et al. | Mar. 22, 1955 |
| 2,736,266 | Eisele | Feb. 28, 1956 |
| 2,737,897 | Dewees | Mar. 13, 1956 |
| 2,761,393 | Di Stefano | Sept. 4, 1956 |
| 2,766,697 | Judd | Oct. 16, 1956 |
| 2,811,110 | Edwards | Oct. 29, 1957 |
| 2,827,261 | Parker | Mar. 18, 1958 |
| 2,850,984 | Shipley et al. | Sept. 9, 1958 |
| 2,923,246 | Wright | Feb. 2, 1960 |

FOREIGN PATENTS

| | | |
|---|---|---|
| 475,781 | France | Mar. 25, 1915 |
| 935,888 | France | July 2, 1948 |
| 1,096,505 | France | June 21, 1955 |
| 446,628 | Germany | July 4, 1927 |